May 10, 1960  J. L. SNARR  2,936,052
COMBINED CONTROL OF MOTOR AND CLUTCH
Filed June 21, 1956  2 Sheets-Sheet 1

Inventor
James L. Snarr
by Stevens, Davis, Miller & Mosher
his attorneys 2,936,052

COMBINED CONTROL OF MOTOR AND CLUTCH

James L. Snarr, Ottawa, Ontario, Canada, assignor to Atomic Energy of Canada Limited, Ottawa, Ontario, Canada, a company Application June 21, 1956, Serial No. 592,804

5 Claims. (Cl. 192—.02)

This invention relates to a clutch control. In the case of large medical treatment equipment such as beam therapy units it is advantageous to drive the equipment by motor, particularly in the case of a rotational unit in which the source and shields may be moving continuously in an orbit during the treatment. However, a large motor driven piece of equipment can be dangerous to persons in the way of the equipment and can itself be seriously damaged if a foreign body is in the path of the equipment. It is impractical to provide safety shields as these would interfere with the operation of the equipment and in any event would not be fully effective to avoid injury or damage.

The object of this invention is to provide a clutch control for a clutch which may for example be inserted between a prime mover such as an electric motor and a driven member such as a beam therapy unit. The clutch is controlled so that it will transmit without slipping a torque which varies according to whether the equipment is running during normal operation or is being started or reversed. The clutch control can be arranged to permit the transmission of just sufficient torque to maintain the momentum of the equipment while the equipment is running at full speed, and to transmit a higher torque when the equipment is being started or reversed. As a consequence the equipment is readily brought to rest if a person or foreign object comes into its path. Another application of the clutch control arises where a high inertia gear train and/or load is being driven, in which case the torque transmitted without slip by a clutch between the prime mover and the gear train can be decreased during starting and reversing to permit slip and thus lessen the starting torque.

The manner in which the foregoing and other objects are achieved will be apparent from the detailed description which follows of the preferred embodiments of this invention. The scope of this invention is defined in the appended claims.

In the drawings illustrating the preferred embodiment of this invention:

Figure 1:
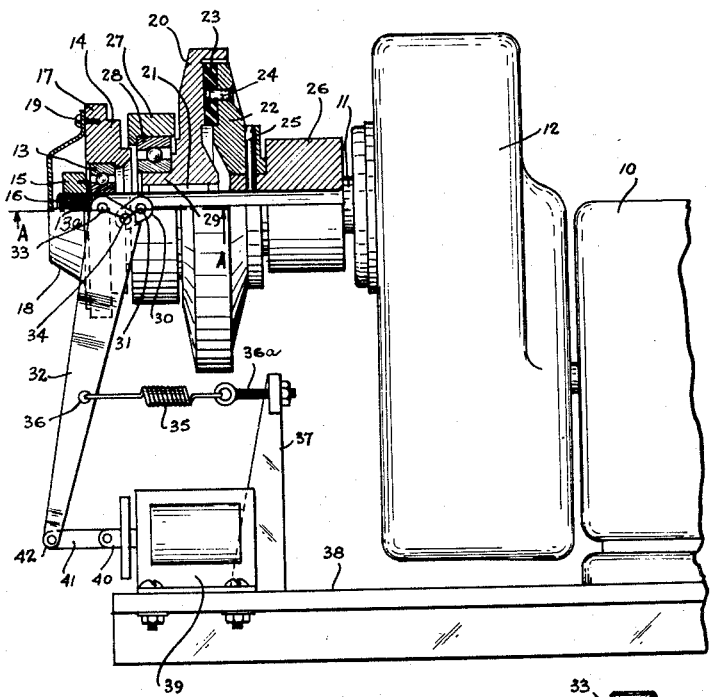
Figure 1 is a side elevation view, partly in section of a clutch construction in accordance with this invention.
Figure 2:
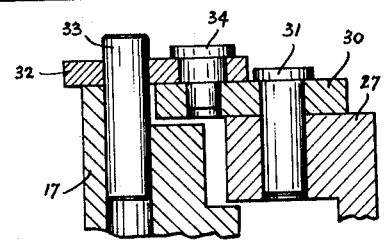
Figure 2 is a section view on the line A—A of Figure 1.
Figure 3:
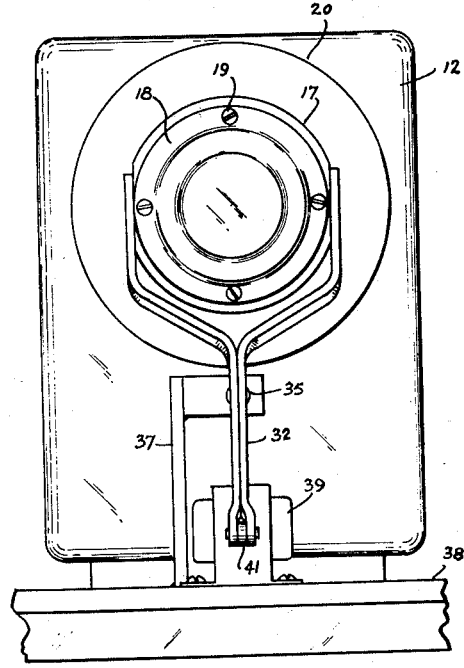
Figure 3 is an end elevation view corresponding to Figure 1.

In Figures 1 to 3 of the drawings, motor 10 drives shaft 11 through transmission 12 which may, for example, be a Graham drive. Shaft 11 is journalled at its free end by thrust bearing 13 in bearing housing 14. A retaining and adjustment nut 15 is secured to the threaded end 16 of shaft 11 to hold inner race 13a of thrust bearing 13 in position. Bearing housing 14 comprises a collar 17 to which an annular cover plate 18 is secured by bolts 19.

A clutch plate 20 is splined at 21 to shaft 11 for engagement with a clutch plate 22 having a friction element 23 secured to it by bolts 24. Clutch plate 22 is secured by pin 25 to a drive pulley 26. Clutch plate 22 and drive pulley 26 are mounted for free rotation upon shaft 11.

A collar 27 is mounted by thrust bearing 28 on a boss portion 29 of clutch plate 20 so as to be movable laterally with but rotatable with respect to clutch plate 20. Link 30 is pivotally secured by pin 31 to collar 27. Control lever 32 is pivotally secured by pin 33 to collar 17 of bearing housing 14 and is connected by pin 34 to link 30. It will be appreciated that anticlockwise biasing of control lever 32 with respect to pivot pin 33 results in an increase in the friction between clutch plate 20 and friction element 23 of clutch plate 22. Control lever 32 is biased in an anticlockwise direction by tension spring 35 which is connected to an intermediate portion 36 of control lever 32 and is secured by adjustment screw 36a to an anchorage flange 37. Adjustment screw 36a is adjusted to a position such that pulley 26 and the unit (not shown) driven by pulley 26 will just rotate at top speed without slip between clutch plate 20 and friction element 23. Anchorage flange 37 is mounted on base plate 38 which supports motor 10 and transmission 12.

A solenoid 39, mounted on base plate 38, has an actuating shaft 40 connected by link 41 to the free end 42 of control lever 32. Energization of solenoid 39 creates an increased pressure between clutch plate 20 and friction element 23. Solenoid 39 is energized during starting and reversing in the manner which will be described below so as that during starting and reversing there will be sufficient friction between clutch plate 20 and friction element 23 to overcome the inertia of the unit being driven. Once the unit is being rotated at near maximum speed, solenoid 39 will be de-energized and the only force maintaining pressure between clutch plate 20 and friction element 23 will be that exerted by spring 35. Accordingly if the unit should strike or be interfered with by some object, slip will immediately occur between clutch plate 20 and friction element 23 and the only torque driving the unit forward will be that torque which may be transmitted through clutch plates 20 and 22 due to the tension on lever 32 of the spring 35.

Figure 4:
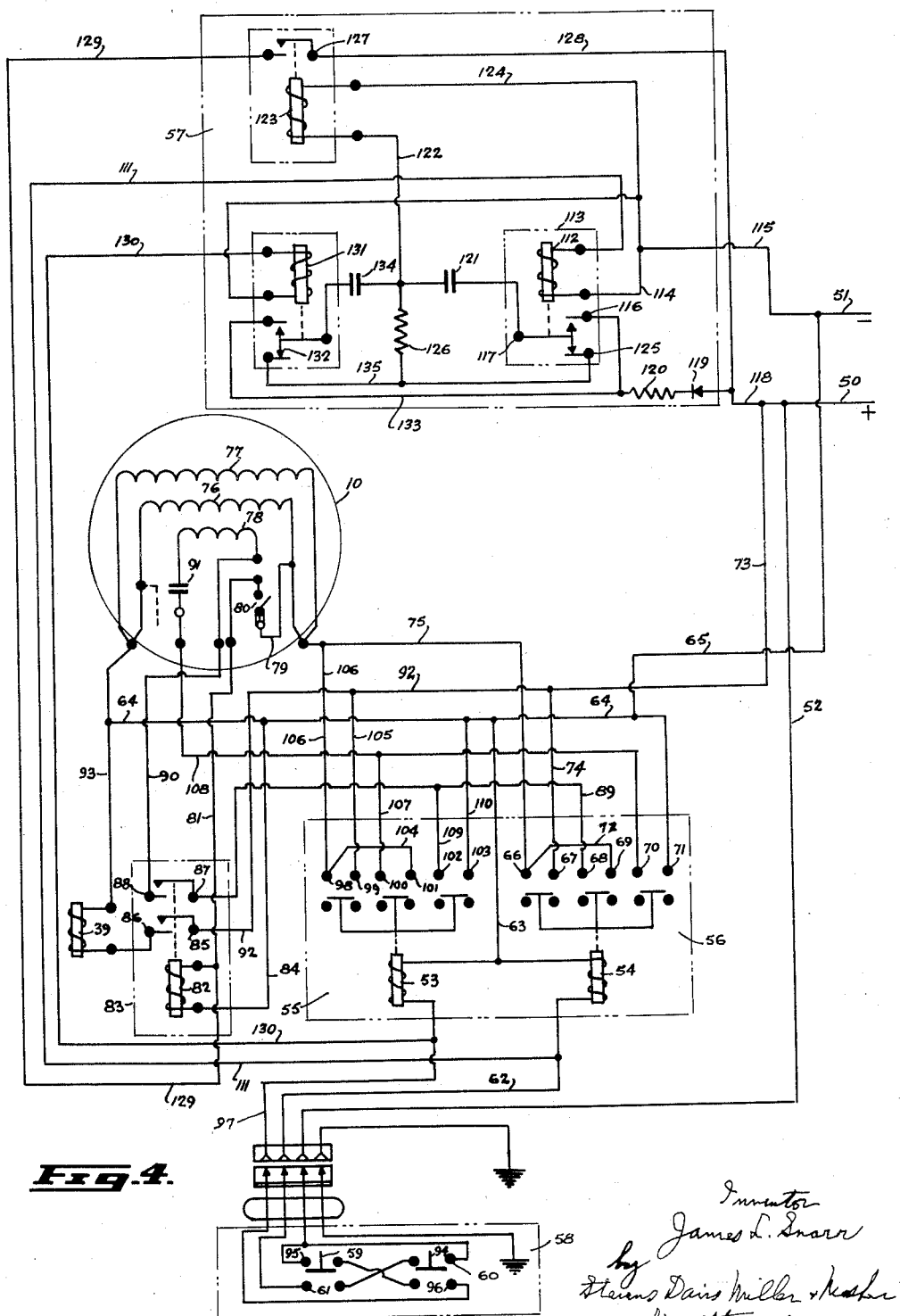
Figure 4 is a circuit diagram of the electrical connections for actuating the clutch.

Figure 4 of the drawings shows the circuit used to energize clutch solenoid 39 when motor 10 is started or reversed. In Figure 4 the power source is shown as being a single phase A.C. system comprising line 50 at one potential and line 51 at a different potential. Line 52 connected to line 50 of the power source energizes the control solenoids 53 or 54 of relays 55 and 56, and also the time delay means indicated generally at 57 in accordance with the position of multiple hand control switch 58. When push button 59 of switch 58 is depressed terminal 60 of switch 58 is connected to terminal 61 energizing control solenoid 54 through line 62 and return lines 63, 64 and 65 leading to the line 51 of the power source. The energization of control solenoid 54 causes terminal 66 of relay 56 to be connected to terminal 67, terminal 68 to 69 and terminal 70 to 71. Terminals 66 and 69 are linked by line 72. The closing of relay 56 causes power to be directed from the line 50 of the power source through lines 73 and 74, terminals 67 and 66 and line 75 to main windings 76 and 77 of motor 10. The return from main windings 76 and 77 passes along lines 64 and 65.

Line 75 also causes starting winding 78 to be energized, since line 75 is connected through line 79, centrifugal switch 80 (which is closed during starting) and line 81 to the control solenoid 82 of relay 83. The return from solenoid 83 passes by line 84 to return line 64. The energization of solenoid 82 causes terminal 85 to be connected to terminal 86 and terminal 87 to be connected to terminal 88. Starting winding 78 is then energized through lines 73 and 74, terminals 67, 66, 69 and 68, line 89, terminals 87 and 88 and line 90. The return from starting winding 78 passes through capacitance 91, line 108, terminals 70 and 71 to return line 65.

The energization of solenoid 82 also connects terminals 85 and 86 causing clutch solenoid 39 to be energized through lines 73 and 92 and terminals 85 and 86. The return from clutch solenoid 39 passes by line 93 to return line 64.

Accordingly the depression of button 59 to start the motor in a forward direction causes the main windings 76 and 77, the starting winding 78 and clutch solenoid 39 to be energized. When motor 10 has reached about 70% of its maximum speed, centrifugal switch 80 opens in a conventional manner. Instead, however, of merely disconnecting starting winding 78 as in the conventional motor the opening of centrifugal switch 80 de-energizes solenoid 82 opening relay 83 so as to de-energize both the starting winding 78 and clutch solenoid 39.

It will be noted that the circuit described independently energizes the starting winding 78 and clutch solenoid 39. The apparently simple expedient of merely connecting the clutch solenoid 39 in parallel with starting winding 78 is unsatisfactory as the starting winding then acts as a generator while the motor 10 is running applying a high voltage to clutch solenoid 39.

As will be apparent solenoid 82 is independently energized through time delay circuit 57 when motor 10 is started but in the embodiment shown in Figure 4 in which solenoid 82 is energized in the manner described above the time delay circuit 57 is important only for changing from forward to reverse or reverse to forward motion of motor 10 while this motor is running at maximum speed. If it were preferred to actuate relay 83 or directly to energize clutch solenoid 39 solely from the time delay circuit 57 then the time delay circuit 57 would be an essential element in starting as well as in reversing the motion of motor 10.

When it is desired to reverse motor 10, switch 94 is depressed and switch 59 released to connect terminals 95 and 96. Solenoid 53 is then energized through line 52, terminals 95 and 96, and line 97. This causes terminal 98 of relay 55 to be connected to terminal 99, terminal 100 to 101 and terminal 102 to terminal 103. Line 104 connects terminals 98 and 101. Main windings 76 and 77 are then energized through lines 73, 92 and 105, terminals 99 and 98 and line 106, the return being through lines 64 and 65. Power is supplied to starting winding 78 through lines 73, 92 and 105, terminals 99 and 98, 101 and 100, lines 107 and 108 and capacitor 91. The return from starting winding 78 passes through line 90, terminals 88 and 87, lines 89 and 109, terminals 102 and 103 and line 110 to return line 64.

The solenoid 82 of relay 83 is initially energized from time delay circuit 57, which causes motor 10 to slow down to a predetermined speed at which centrifugal switch 80 closes. When centrifugal switch 80 closes, solenoid 82 will continue to be energized through a circuit from lines 73 and 105, terminals 99 and 98, line 106 and 79, centrifugal switch 80, line 81, solenoid 82, return lines 84 and 64, until the predetermined speed is reached in a reverse direction when the centrifugal switch 80 opens, de-energizing solenoid 82. The energization of solenoid 82 first from time delay circuit 57 and then through centrifugal switch 80 when the direction of rotation of motor 10 is reversed also causes contacts 85 and 86 of relay 83 to be linked energizing clutch solenoid 39 through lines 73 and 92, terminals 85 and 86 and returning through lines 93 and 64.

Time delay circuit 57 energizes solenoid 82 so as to cause both starting winding 78 and clutch solenoid 39 to be energized each time solenoid 53 or relay 55 or solenoid 54 of relay 56 is energized. As indicated previously the impulse given by the time delay circuit upon the energization of solenoid 53 will be important where the direction of motion of motor 10 is being changed from a forward to a reverse direction, and the impulse consequent on the energization of solenoid 54 will be important where the motor 10 is running in reverse and is being changed to run in a reverse direction. Impulses are also given when the motor 10 is being started for either forward or reverse rotation but in the latter case the impulses are not of importance unless used as the sole means of energizing clutch 39 and/or starting winding 78.

When solenoid 54 is energized, power is at the same time directed from line 52 through switch 58 and line 62 through line 111 to energize solenoid 112 of relay 113 returning through lines 114 and 115 to line 51. The energization of solenoid 112 causes terminals 116 and 117 of relay 113 to be connected to pass direct current derived from line 50 and 118 by rectifier 119 through resistor 120, terminals 116 and 117, capacitor 121 and line 122 to energize solenoid 123, returning by line 124 and 115 to line 51. Solenoid 123 is energized for a time limited by the rating of capacitor 121. When solenoid 112 is eventually de-energized capacitor discharges through terminals 117 and 125 and resistance 126. The energization of solenoid 123 closes relay 127 for a limited time completing a circuit extending from lines 50, 118 and 128, through relay 127, line 129 and solenoid 82 to return lines 84 and 64. Similarly when solenoid 53 is energized and solenoid 54 de-energized to reverse motor 10, power from line 50 passes through line 52, switch 58, lines 97 and 130, energizing solenoid 131 to close relay 132. Direct current from rectifier 119 and resistance 120 then passes along line 133, through relay 132 and capacitance 134 and line 122 to energize solenoid 123, closing relay 127 in the same manner as before. In the meanwhile the de-energization of solenoid 54 opens relay 113 permitting capacitor 121 to discharge. Capacitor 134 discharges in a similar manner upon the de-energization of solenoid 53, through line 135 and resistance 126. Thus the capacitor which will next be utilized is discharged either when motor 10 is stopped or while the other capacitor is being utilized.

Figure 5:
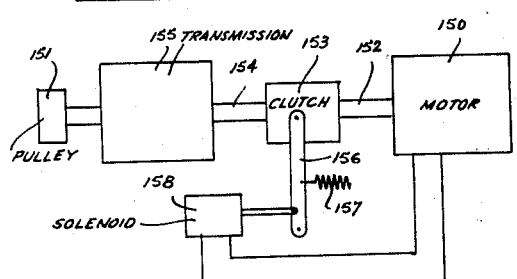
Figure 5 is a diagrammatic view of another embodiment of this invention.

Figure 5 is a diagrammatic illustration of an alternative embodiment of this invention in which motor 150 drives pulley 151 through shaft 152, clutch 153, shaft 154 and transmission 155. Clutch control lever 156 is preloaded by spring 157 so as normally to enable motor 150 to drive transmission 155 and the load driven by pulley 151. Clutch control lever 156, however, is biased by solenoid 158 against the influence of spring 157 during starting and reversing of motor 150 to release clutch 153 or to allow it to slip. Solenoid 158 is controlled through connections 159 in the same manner as that shown in Figure 4. The embodiment in Figure 5 is useful in dealing with problems arising due to high inertia transmissions or loads.

A wide variety of motors having a starting winding can be used such as, for example, a single phase capacitor start motor, a split phase motor having a centrifugal switch and a starting winding and a capacitor start, induction run motor. In the preferred embodiment of the invention the connections to the starting winding of the motor are reversed to reverse the motor. However, it is well known that motors of this type can alternatively be reversed by reversing the connections to the main winding. In either case the means for reversing the motor including the time delay circuit as described has an advantage over the normal thermal connections in that the direction of rotation can be changed without waiting for thermal connections to cool.

I claim:

1. A clutch control comprising the combination of a prime mover having starting and reversing means, a driven member for driving a load, a clutch, having frictionally engaging clutch elements, coupling said prime mover to said driven member, means applying a predetermined pressure to engage said clutch elements and permitting slip between said clutch elements at a torque barely sufficient to transmit drive from said prime mover to said driven member when said prime mover is running at its maximum speed, means applying an additional pressure to said clutch elements during starting and reversing of said prime mover to raise the torque at which slip occurs between said clutch elements sufficiently to compensate for the starting and reversing inertia of said driven member and its load and means operably coupled between said starting and reversing means and said means for applying an additional pressure automatically actuating said means for applying an additional pressure upon the starting and upon the reversing of said prime mover.

2. A clutch control comprising the combination of an electric motor having a starting winding, a clutch driven by said electric motor, said clutch having frictionally engaging clutch elements, a driven member driven by said clutch, means applying a predetermined pressure to engage said clutch elements and permitting slip between said clutch elements at a predetermined torque, means acting upon said clutch elements to permit slip between said clutch elements at a different torque from said predetermined torque and means operably coupled with said starting winding and with said means acting upon said clutch elements energizing said means for acting upon said clutch elements each time said starting winding is energized for the duration of the energization of said starting winding.

3. A clutch control comprising the combination of an electric motor having main and starting windings, and a centrifugal switch controlling the energization for the starting winding, a clutch driven by said electric motor, said clutch having frictionally engaging clutch elements, a driven member driven by said clutch, means applying a predetermined pressure to engage said clutch elements and permitting slip between said clutch elements at a predetermined torque, means acting upon said clutch elements to permit slip between said clutch elements at a different torque from said predetermined torque and means energizing said means for acting upon said clutch elements each time said starting winding is energized, for the duration of the energization of said starting winding, said energizing means comprising a relay the closing of which completes one circuit energizing the starting winding and a second circuit energizing said means for acting upon said clutch elements, means closing said relay upon the passage of power through said centrifugal switch, means for reversing one of said windings to reverse said electric motor and time delay means energizing said relay upon the reversal of said one of said windings for a time sufficient for said centrifugal switch to close.

4. A clutch control as in claim 3 in which said means acting upon said clutch elements act to permit slip between said clutch elements at a higher torque than said predetermined torque.

5. A clutch control as in claim 3 in which said time delay means comprises a circuit energizing said relay, a second relay completing said circuit when the second relay is closed, a first control circuit including a first capacitance and a second control circuit including a second capacitance, the passage of current through either of said first and second control circuits acting to close said second relay, means passing current through said first control circuit and opening said second control circuit when said one of said windings is reversed to change from a forward to a backward rotation of said electric motor and means passing current through said second control circuit and opening said first control circuit when said one of said windings is reversed to change from a backward to a forward rotation of said electric motor, and means discharging said capacitances upon the opening of their respective circuits.

References Cited in the file of this patent

UNITED STATES PATENTS

| | | |
|---|---|---|
| 2,214,901 | Griffin | Sept. 17, 1940 |
| 2,473,244 | Fuller | June 14, 1949 |
| 2,577,173 | Worst | Dec. 4, 1951 |
| 2,595,749 | Arnot | May 6, 1952 |
| 2,695,086 | Parker | Nov. 23, 1954 |
| 2,735,976 | Danly | Feb. 21, 1956 |